(12) United States Patent
Blasig

(10) Patent No.: US 6,691,088 B1
(45) Date of Patent: Feb. 10, 2004

(54) METHOD OF DETERMINING PARAMETERS OF A STATISTICAL LANGUAGE MODEL

(75) Inventor: Reinhard Blasig, Aachen (DE)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/421,646

(22) Filed: Oct. 20, 1999

(30) Foreign Application Priority Data

Oct. 21, 1998 (DE) .......................................... 198 48 415
Oct. 21, 1998 (EP) ............................................ 98119914

(51) Int. Cl.$^7$ .............................................. G01L 15/14
(52) U.S. Cl. ....................................... 704/240; 704/255
(58) Field of Search ................................ 704/243, 244, 704/245, 240, 251, 255, 236

(56) References Cited

U.S. PATENT DOCUMENTS

| | | | | |
|---|---|---|---|---|
| 5,745,876 A | * | 4/1998 | Kneser et al. ............... | 704/255 |
| 6,009,392 A | * | 12/1999 | Kanevsky et al. .......... | 704/245 |
| 6,081,779 A | * | 6/2000 | Besling et al. .............. | 704/257 |
| 6,125,345 A | * | 9/2000 | Modi et al. ................. | 704/240 |
| 6,157,912 A | * | 12/2000 | Kneser et al. ............... | 704/270 |
| 6,208,971 B1 | * | 3/2001 | Bellegarda et al. ......... | 704/275 |

OTHER PUBLICATIONS

P. Kneser, "Statistical language modeling using a variable context length," International Conference on Spoken Language Proceedings, ICSLP 96, Oct. 1996, vol. 1, pp. 494 to 497.*

Kneser et al., "Improved backing–off for M–gram language modeling," International Conference on Acoustics, Speech, and Signal Processing, ICASSP–95, May 1995, vol. 1, pp. 181 to 184.*

Kneser et al., "Semantic clustering for adaptive language modeling," IEEE International Conference on Acoustics, Speech, and Signal Processing, ICASSP–97, Apr. 1997, vol. 2, pp. 779 to 782.*

Combination of Word–Based and Category Based Language Models, T.R. Niesler et al, Proc. ICSLP, vol. 1, pp. 220–223, Oct. 1996.

* cited by examiner

*Primary Examiner*—Richemond Dorvil
*Assistant Examiner*—Martin Lerner

(57) ABSTRACT

An apparatus and method of determining parameters of a statistical language model for automatic speech recognition systems using a training corpus are disclosed. To improve the perplexity and the error rate in the speech recognition, at least a proportion of the elements of a vocabulary used is combined so as to form context-independent vocabulary element categories. The frequencies of occurrence of vocabulary element sequences, and if applicable, the frequencies of occurrence of derived sequences formed from the vocabulary element sequences through the replacement of at least one vocabulary element by the associated vocabulary element class, are evaluated in the language modeling process. The parameters of the language model are then derived from the evaluated frequencies of occurence.

5 Claims, No Drawings

METHOD OF DETERMINING PARAMETERS OF A STATISTICAL LANGUAGE MODEL

FIELD OF THE INVENTION

The invention relates to a method of determining parameters of a statistical language model for automatic speech recognition systems by means of a training corpus.

Automatic speech recognition systems based on large vocabularies and used, for example, for dictation systems utilize on the one hand acoustic models and on the other hand language models, which models are interrelated by means of the Bayes formula. Acoustic modeling is based on so-called HMM ("Hidden Markov Models"). Parameter values of the language model which were determined from the frequencies of occurrence (so-called "counts") in the training corpus and which represent probability values are assigned to single vocabulary elements such as words or to sequences of vocabulary elements (so-called n-grams) such as, for example, bigrams (n=2) and trigrams (n=3) in the language modeling process.

DESCRIPTION OF PRIOR ART

It is known from T. R. Niesler and P. C. Woodland, "Combination of word-based and category-based language models", Proc. ICSLP, vol. 1, pp. 220–223, October 1996, to base a language model on n-grams of different lengths n with corresponding conditional probabilities, wherein either a sequence of words or a sequence of categories is used as the history for a word of the vocabulary, and a category embraces a plurality of different words of the vocabulary each time. In the cases with category-based histories, the conditional probability for said category derived through evaluation of the relevant frequency of occurrence (count) is multiplied by a weighting factor corresponding to the probability of the word within said category.

SUMMARY OF THE INVENTION

One object of the invention is to modify the process of speech modeling such that the perplexity and the error rate in the speech recognition are improved.

This object is achieved in that at least a proportion of the elements of a vocabulary used is combined so as to form context-independent vocabulary element categories, in that the frequencies of occurrence of vocabulary element sequences, and if applicable the frequencies of occurrence of derived sequences formed from said vocabulary element sequences through the replacement of at least one vocabulary element by the associated vocabulary element class, are evaluated in the language modeling progress, and in that the parameters of the language model are derived from the frequencies of occurrence thus determined.

In such a process of estimating language models, the sequences of vocabulary elements and/or vocabulary element classes can be optimally attuned to the vocabulary and training material used at any time. In particular, one vocabulary element represents one word each time. The use of vocabulary element classes has the result that probability values can be better estimated, and that a smaller training corpus suffices compared with a language modeling process without the use of vocabulary element classes for achieving equally good perplexity values and error rates. Any vocabulary element of a vocabulary element sequence may be replaced by the associated vocabulary element category, if applicable. The required memory space is also reduced. An alternative or a corrective measure based on pure vocabulary element sequences is always available in the method according to the invention for those vocabulary elements for which a description by means of a category assignment is less suitable.

DETAILED DESCRIPTION OF THE PREFERRED EMBODIMENTS

In an embodiment of the invention, both the frequency of occurrence of the vocabulary element sequence and the frequencies of occurrence of the derived sequences are used for forming a language model parameter from a sequence of vocabulary elements and associated derived sequences which each comprise at least one vocabulary element category. All sequences of vocabulary elements or vocabulary element classes formed for determining a language model parameter in this embodiment take part in the formation of this language model parameter. Preferably, an average value is formed for the language model parameters of the respective sequences of vocabulary elements or vocabulary element categories.

A further embodiment may be characterized in that, for the formation of a language model parameter from a sequence of vocabulary elements and associated derived sequences which each comprise at least one vocabulary element class, exclusively the frequency of occurrence of one of said sequences is utilized. A possible selection criterion is a criterion oriented towards minimizing the perplexity.

The invention also relates to an automatic speech recognition system with a statistical language model formed in accordance with the method according to the invention.

Embodiments of the invention will now be described in more detail.

First, a word-based language modeling process with n-grams of variable length n (referred to as varigrams hereinafter) will be elucidated below. The language model thus formed, based on varigrams for a given vocabulary and training corpus, is denoted L. Given a certain word history $h_k = (w_{i-k}, \ldots, w_{i-1})$ with a length k, the probability of a subsequent word $w = w_i$ is calculated as:

$$p(w \mid h_k) = \begin{cases} \alpha(w \mid h_k) + \gamma(h_k) p(w \mid h_{k-1}) & \text{if } (h_k, w) \in L \\ \gamma(h_k) p(w \mid h_{k-1}) & \text{if } (h_k, w) \in L, \exists w' : (h_k, w') \in L \\ p(w \mid h_{k-1}) & \text{in other cases} \end{cases}$$

with $$\alpha(w \mid h_k) = \frac{d(N(h_k, w))}{N(h_k)},$$

$$\gamma(h_k) = \frac{d_k N_+(h_k) + N(h_k) - \sum_{(h_k, w) \in L} N(h_k, w)}{N(h_k)}.$$

The language model is determined here by means of a set of word sequences $(h_k, w)$ and associated frequencies of occurrence $N(h_k, w)$ in the training corpus. $\gamma(h_k)$ is a normalizing factor and is so determined that the sum of all probability values $p(w \mid h_k)$ of the language model for all $w \in V$ becomes 1. The term $N_+(h_k)$ represents the number of different words w which were seen in the training corpus as possible followers of the history $h_k$. The function $d(.)$ implements a so-called absolute discounting function by means of which it is taken into account that certain word sequences do not occur in the training corpus. A certain probability value is also assigned to such word sequences. The function d(.) is determined by:

$$d(N(h_k, w)) = \begin{cases} 0 & \text{if } N(h_k, w) < d_k \\ N(h_k, w) - d_k & \text{if not} \end{cases}$$

in which $d_k$ is a constant which is to be determined heuristically, preferably from the interval [0,1], and preferably dependent on the value of $N(h_k, w)$ and the length k of the history $h_k$.

The language model according to the invention describes word histories by means of sequences of words and/or context-independent word classes (also called word categories) of various lengths, which may accordingly also be called varigrams. At least a proportion of the words $w_j$ of the vocabulary is then contained in one respective word category $c(w_j)$, while one word in this case can only belong to exactly one category and not to several categories. A possibility for optimizing such word categories is described, for example, in R. Kneser, H. Ney, "Improved Clustering Techniques for Class-Based Statistical Language Modeling", Proc. EUROSPEECH, pp. 973–976, September 1993.

History descriptions $b_k \in B_L(h_k)$ with $B_L(h_k) \subseteq L$ consisting of sequences of words and/or word categories c(.) are now applied instead of histories $h_k$ based purely on words.

On the one hand, the word categories should be as large as possible, so that words of the word categories can be spotted as often as possible in the training corpus and the determined varigram probability values are as reliable as possible, but on the other hand the members of any word category should also be so chosen that the homogeneity in the probability values for a word w is as great as possible, given the history descriptions $b_k$ comprising word categories, i.e. $p(w|b_k)$ should assume values which are as similar as possible, irrespective of whether a word is viewed as a word per se or as an element of a word category. The approach according to the invention here provides a good compromise. All possible combinations of words and—in as far as they are available for the words—word categories are taken into account for every history description $b_k$ in the count of frequencies of occurrence $N(h_k, w)$ for the language model. Given a history description of a length k, there will be $2^k$ combination possibilities, i.e. $2^k$ different associated history descriptions $b_k$. For example, with a history description $b_k$ having a length k=2, wherein a word category exists for each word present, the following history descriptions for a word $w=w_i$ (or for conditional probabilities $p(w|b_k)$), are obtained:

$w_{i-2}w_{i-1}$, $c(w_{i-2})w_{i-1}$, $w_{i-2}c(w_{i-1})$, $c(w_{i-2})c(w_{i-1})$.

The use of word categories has the advantage that fewer language model parameters are to be estimated, so that again smaller training corpora will suffice, and less memory space is required in the data processing system used and/or less training material is required. The word categories used here are independent of context, i.e. they are independent of the adjoining words of a word within certain varigrams. Eligible word categories are, for example, articles or numerals, or similarly sounding words.

In this approach, modified values $\alpha'(w|h_k)$ and $\gamma'(w|h_k)$ are to be calculated instead of $\alpha(w|h_k)$ and $\gamma(w|h_k)$, as follows:

$$\alpha'(w|h_k) = \frac{\sum_{b_k \in B_L(h_k)} \alpha(w|b_k)}{|B_L(h_k)|} \text{ and}$$

$$\gamma'(w|h_k) = \frac{\sum_{b_k \in B_L(h_k)} \gamma(w|b_k)}{|B_L(h_k)|}$$

The determination of $\alpha(w|b_k)$ and $\gamma(w|b_k)$ follows from the formulas for word-based varigrams discussed above, wherein only the history descriptions $b_k$ are to be used instead of the histories $h_k$. The calculation of $\alpha'(w|h_k)$ and $\gamma'(w|h_k)$ thus includes both the frequency of occurrence of the word sequence represented by $b_k$ and the frequencies of occurrence of the sequences comprising words and word categories or only word categories and represented by $b_k$. The expression $|B_L(h_k)|$ here represents the cardinality of the quantity $B_L(h_k)$, i.e. equals the number of the elements of the quantity $B_L(h_k)$. This calculation variant corresponds to the formation of an average value for $\alpha(w|b_k)$ and $\gamma(w|b_k)$.

A further modification of the invention utilizes an perplexity criterion for determining values $\alpha''(w|b_k)$ and $\gamma''(w|b_k)$ instead of the values $\alpha(w|b_k)$ and $\gamma(w|b_k)$ defined for word-based varigrams. This criterion is defined as follows:

$$\Delta_{LL}(b) = \sum_{i=1}^{N_G} \log \frac{p_{LOO}(w_i|(w_1 \ldots w_{i-1}), L)}{p_{LOO}(w_i|(w_1 \ldots w_{i-1}), L\backslash(b, w_i))}$$

$p_{LOO}(.)$ here represents a probability which is calculated from a so-called leaving-one-out method. Reference is made in this connection to R. Kneser, H. Ney, "Improved Clustering Techniques for Class-Based Statistical Language Modeling", Proc. EUROSPEECH, pp. 973–976, September 1993.

The most suitable history description b* is now determined by forming a maximum:

$$b^* = b_L^*(h_k) = \text{argmax}_{b \in B_L(h_k)} \frac{\Delta_{LL}(b)}{N(b)}.$$

N(b) here is the frequency of occurrence of the history description b in the training corpus. The values of $\alpha$ and $\gamma$ then become:

$$\alpha''(w|h_k) = \frac{d(N(b^*, w) - \sum_{(b', w) \in L} p^*(b'|b^*)d(N(b', w)))}{N(b^*) - \sum_{(b', w) \in L} p^*(b'|b^*)(N(b', w) - d)} \text{ and}$$

$$\gamma''(h_k) = \frac{d_k N_+(b^*) + N(b^*) - \sum_{(b', w) \in L} N(b^*, w))}{N(b^*) - \sum_{(b', w) \in L} p^*(b'|b^*)d(N(b', w))}.$$

The expression p*(b'|b*) represents a probability value for a reduction in length of the history description b' to the history description b* of smaller length. Words may change into word categories and vice versa depending on which word categories are possible at all in the case at hand. All variants of a reduction in length are basically taken into account. The exact choice for the reduction in length depends on the relevant values $\Delta_{LL}(.)/N(.)$ specified above in the final analysis.

What is claimed is:

1. A method of determining parameters of a statistical language model for automatic speech recognition systems using a training corpus, comprising the steps of:

combining at least a portion of elements of a vocabulary to form context-independent vocabulary element classes, wherein the context-independent vocabulary elements are independent of adjoining elements of a context-independent vocabulary element class;

evaluating frequencies of occurrence of vocabulary element sequences, and any of the frequencies of occurrence of derived sequences formed from the vocabulary element sequences by replacement of at least one vocabulary element by an associated vocabulary element class; and deriving the parameters of the language model from the evaluated frequencies of occurrence.

2. A method as claimed in claim 1, wherein both the frequency of occurrence of the vocabulary element sequence and the frequencies of occurrence of the derived sequences are used for forming a language model parameter from a sequence of vocabulary elements and associated derived sequences which each comprise at least one vocabulary element class.

3. A method as claimed in claim 1, wherein if the sequence of vocabulary elements and associated derived sequences comprise at least one vocabulary element class, then only one of the sequences is utilized to derive the language model parameter.

4. An automatic speech recognition system with a statistical language model formed in accordance with claim 1.

5. The method of claim 1, wherein, for at least one of the derived sequences, the replacement operates on a vocabulary element sequence comprising a plurality of vocabulary elements to replace fewer than all of the plural elements.

* * * * *